Feb. 11, 1941.   L. S. LACHMAN   2,231,474
STRUCTURAL JOINT
Filed April 10, 1939   2 Sheets-Sheet 1
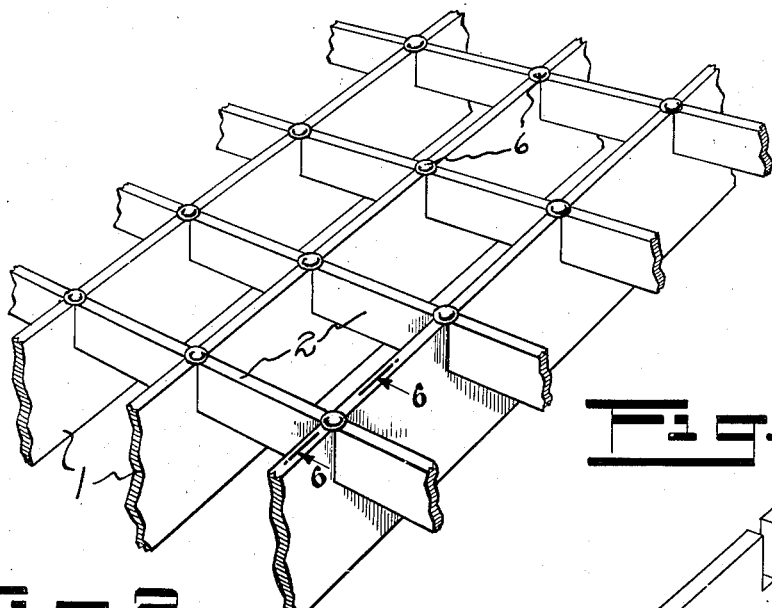
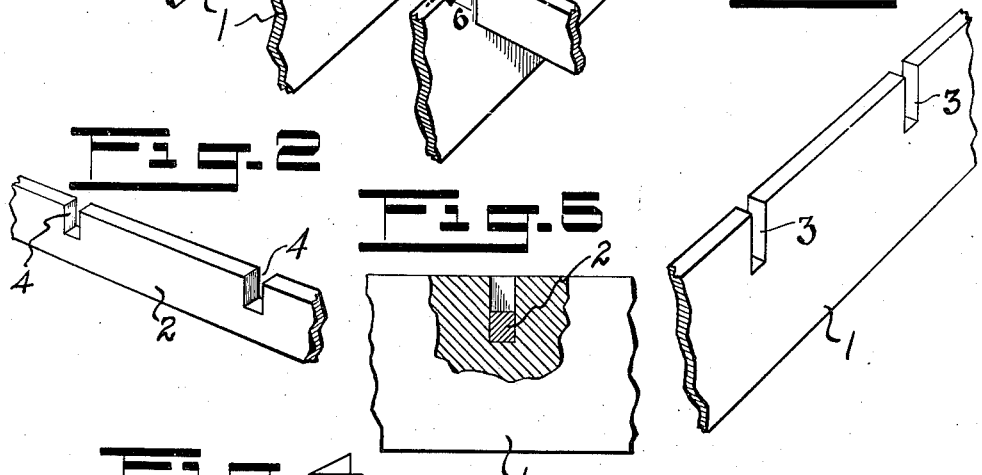
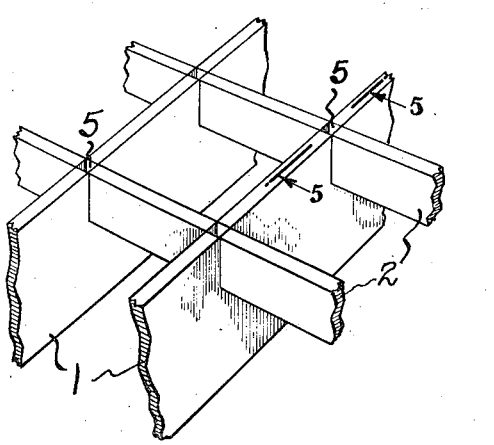
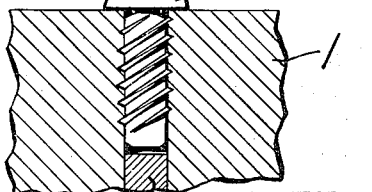
INVENTOR.
Lawrence S. Lachman
BY Darby & Darby
ATTORNEYS Feb. 11, 1941. L. S. LACHMAN 2,231,474
STRUCTURAL JOINT
Filed April 10, 1939 2 Sheets-Sheet 2
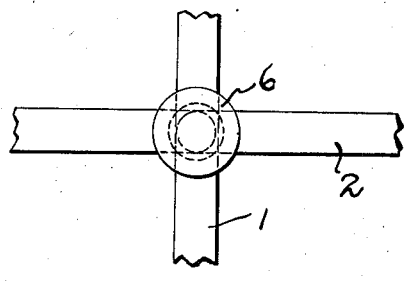
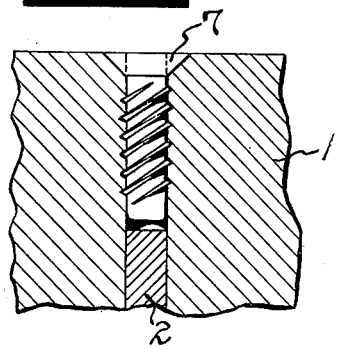
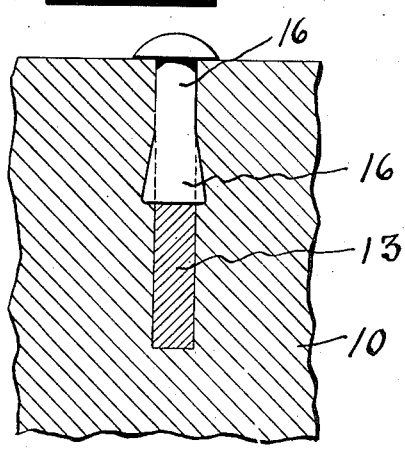
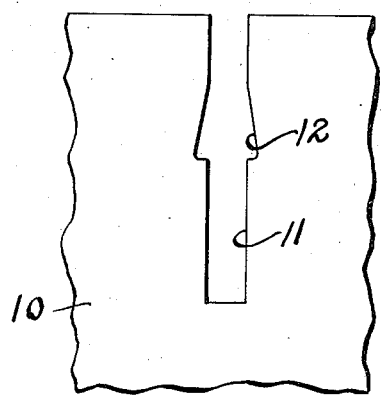
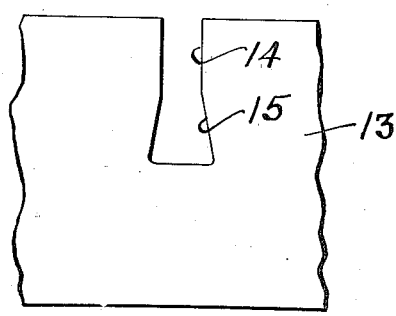
INVENTOR.
Laurence S. Lachman
BY
ATTORNEYS Patented Feb. 11, 1941

2,231,474

UNITED STATES PATENT OFFICE 2,231,474

STRUCTURAL JOINT

Laurence S. Lachman, Forest Hills, N. Y.

Application April 10, 1939, Serial No. 267,011

2 Claims. (Cl. 189—82)

This invention relates to improved methods of joining and securing structural members together, such as are formed, for example, in grills, gratings, bridge decking, and the like.

The grill of this invention is of the general nature comprising substantially longitudinal members preferably made of metal intersected by lighter, transversely extending members, preferably made of metal, and united together in a simple manner to form a strong, rigid construction which places the members under compression.

The detailed objects of this invention will be apparent from the following description of several forms thereof.

This invention resides substantially in the combination, construction, arrangement and relative location of parts, all in accordance with this disclosure.

In the accompanying drawings,

Figure 1 is a perspective view of a portion of a grill in accordance with this invention;

Figure 2 is a perspective view of one of the transverse members;

Figure 3 is a perspective view of one of the longitudinal members;

Figure 4 is a perspective view of a portion of a grill showing the members assembled but without the fastening means in place;

Figure 5 is a cross-sectional view taken on the line 5—5 of Figure 4;

Figure 6 is a cross-sectional view taken on the line 6—6 of Figure 1;

Figure 7 is a plan view of one of the joints;

Figure 8 is a cross-sectional view similar to Figure 6 showing a modified form of fastening means;

Figure 9 is a cross-sectional view similar to Figure 6 of a modified structure employing a rivet as a fastening means; and Figures 10 and 11 are elevational views of the longitudinal and transverse members respectively formed for use with the rivet fastening means of Figure 9.

In grill work of the type herein disclosed, it is desirable that the members be preloaded, that is, placed under compression, with the object in view of forming a strong, rigid grill work which does not become loose under the strains of use. An object of this invention is the provision of fastening means at the joints at the intersections of the longitudinal and transverse members which in addition to securing these members together place the members under compression.

One form of the invention is illustrated in Figures 1 to 7, inclusive. The longitudinal members 1, which are in the form of flat wide bars, are provided with slots 3 which are of the same depth as the depth of the transverse members 2. The transverse members are likewise in bar form but are of less depth than the longitudinal members. They are provided with the slots 4 which extend about half-way down the depth thereof. In forming a grill of these members the bars 2 are nested in the slots 3 of the bars 1 which are so spaced that the slots of the two sets of bars are in alignment, as is clear from Figure 4. This forms at each intersection a hollow square, as indicated at 5. In order to secure the bars together in accordance with this invention it is only necessary to drive into these hollow squares hardened screws 6 which under the force of the blows applied thereto rotate as they move into the hollow squares until they are seated, as indicated in Figure 6. As they move the threads on their surface cut complementary threads in the walls defining the hollow squares. It will be seen that the screws are selected as to size so that the diameter thereof at the base of the threads just forms a snug fit in the hollow squares 5. By this means it is possible to very quickly unite the bars at the intersections by simply driving the hardened screws thereinto. The forcing of these hardened screws into place puts the bars 1 under compression.

The only difference between the structure of the preceding figures and that of Figure 8 is that the open ends of the slots 3 and 4 are inclined outwardly so that a hardened screw 7 having a flat head can be driven into the open squares so as to lie flush with the top surface of the grill.

In the construction of Figures 9 to 11, inclusive, the longitudinal members are indicated at 10 and the transverse members at 13. The longitudinal members 10 are provided with slots 11 which are as deep as the transverse members 13 are wide, as before. However, intermediate the ends of these slots the walls thereof diverge for a short distance, as shown at 12. In the case of the slot 14 in the transverse members 13 the base thereof is similarly expanded, as indicated at 15. In other words, the flaring slots 12 and 15 have the same taper and are of the same length. When the transverse bars are assembled in the slots 11 of the longitudinal bars it will be seen that the base of the hollow square resulting as before will have a conical form. In this case the members or bars are secured together at the joints by means of rivets 16 which are sufficiently longer than the depth of the slots 14 so that when they are driven home their lower ends expand to tightly fill the truncated conical space resulting from the slot forms. This arrangement, it will be seen, forms a very strong rigid joint. The expansion of the ends of the rivets 16 tends to place the members under compression as before.

It will be apparent that the advantages and details of this invention may be accomplished by using recesses at the joints which are other than square in cross-section. For example, the members 2, without being first slotted, may be assembled in the members 1 in the slots as shown and then bored at the joint to form a recess which is curved on a pair of opposite sides and flat on the remaining sides. Likewise, the recess may be formed by any suitable method so as to be circular in cross-section while obtaining the same advantages, whether the locking means be in the form of a screw or a rivet. It is, of course, apparent that the invention is not limited to use in grills and gratings but may be employed at any place where it is desired to interlock a pair of structural members.

From the above description it will be apparent to those skilled in the art that the objects of this invention may be secured in other ways without departure from the novel scope thereof.

I do not, therefore, desire to be strictly limited to the disclosure as given for purposes of illustration but rather to the scope of the claims granted me.

What I claim is:

1. A structure of the type described, comprising a plurality of longitudinal members and a plurality of transverse members, said longitudinal members having slots at the points of intersection with the transverse members in which the transverse members lie, said transverse members also being provided with slots aligned with the slots in the longitudinal members to form square recesses, and locking screws lying in said square recesses having their threads engaging the walls thereof.

2. A structure of the type described comprising a plurality of longitudinal members and a plurality of transverse members, said longitudinal members having slots at points of intersection with the transverse members in which the transverse members lie, said transverse members also being provided with slots aligned with the slots in the longitudinal members, all of said slots being open at one end in a common plane to form open ended recesses, and preformed locking members lying in said recesses and tightly engaging the walls thereof.

LAURENCE S. LACHMAN.